(12) United States Patent
Koizumi et al.

(10) Patent No.: US 8,833,810 B2
(45) Date of Patent: Sep. 16, 2014

(54) VEHICLE DOOR HANDLE APPARATUS

(75) Inventors: Tsutomu Koizumi, Kanagawa (JP); Satoshi Kubota, Kanagawa (JP)

(73) Assignee: Alpha Corporation, Yokohama-shi, Kanagawa (JP)

( * ) Notice: Subject to any disclaimer, the term of this patent is extended or adjusted under 35 U.S.C. 154(b) by 457 days.

(21) Appl. No.: 13/060,337

(22) PCT Filed: Dec. 11, 2009

(86) PCT No.: PCT/JP2009/070767
§ 371 (c)(1), (2), (4) Date: May 17, 2011

(87) PCT Pub. No.: WO2010/067870
PCT Pub. Date: Jun. 17, 2010

(65) Prior Publication Data
US 2011/0233945 A1   Sep. 29, 2011

(30) Foreign Application Priority Data

Dec. 12, 2008   (JP) .................................. 2008-317108

(51) Int. Cl.
| | | |
|---|---|---|
| *E05B 3/00* | (2006.01) | |
| *H04L 29/06* | (2006.01) | |
| *G07C 9/00* | (2006.01) | |
| *G06F 21/32* | (2013.01) | |
| *G06F 21/83* | (2013.01) | |
| *H04L 9/32* | (2006.01) | |
| *G06K 9/00* | (2006.01) | |

(52) U.S. Cl.
CPC .... *H04L 63/0861* (2013.01); *G06F 2221/2115* (2013.01); *H04L 2209/043* (2013.01); *G07C 9/00166* (2013.01); *G06F 21/32* (2013.01); *G06K 2009/00953* (2013.01); *G06F 21/83* (2013.01); *G07C 2209/12* (2013.01); *G06F 2221/2153* (2013.01); *H04L 9/3231* (2013.01); *G07C 98/00158* (2013.01); *G06F 2221/2117* (2013.01); *Y10S 292/41* (2013.01); *Y10S 292/22* (2013.01); *Y10S 292/65* (2013.01)

USPC ......... 292/336.3; 292/DIG. 41; 292/DIG. 22; 292/DIG. 65

(58) Field of Classification Search
USPC .......... 292/336.3, DIG. 22, DIG. 41, DIG. 65
See application file for complete search history.

(56) References Cited

U.S. PATENT DOCUMENTS 3,719,248 A * 3/1973 Breitschwerdt et al. ...... 180/271
3,799,596 A   3/1974 Nozomu et al.

(Continued)

FOREIGN PATENT DOCUMENTS

| CN | 1249387 A | 4/2000 |
|---|---|---|
| CN | 1282399 A | 1/2001 |

(Continued)

*Primary Examiner* — Kristina Fulton
*Assistant Examiner* — Faria Ahmad
(74) *Attorney, Agent, or Firm* — Drinker Biddle & Reath LLP

(57) ABSTRACT

A vehicle handle apparatus is provided with: a handle base fixed to a door of a vehicle; an operation handle rotatably connected to the handle base; and a relay lever which is rotatably connected to the handle base, and which is driven to rotate around a pivot by operating the operation handle.

The relay lever is provided with: a sub-lever member including a connecting portion connected to an operating force transmitting member coupled to a door lock device in the door; and a main lever member which is driven to rotate by operating the operation handle.

The sub-lever member and the main lever member are pivotally supported around the pivot so as to relatively rotate with respect to each other. The main lever member is connected with the sub-lever member by a connecting element when the connecting element is in a connecting position. The connecting element is withdrawn from said connecting position by inputting a predetermined acceleration, so that a connection of the main lever member with the sub-lever member is released.

10 Claims, 5 Drawing Sheets

(56) References Cited

U.S. PATENT DOCUMENTS

| | | | |
|---|---|---|---|
| 3,967,844 A * | 7/1976 | Torii et al. | 292/336.3 |
| 6,070,923 A | 6/2000 | Tanimoto et al. | |
| 6,139,073 A | 10/2000 | Heffner et al. | |
| 6,382,688 B1 | 5/2002 | Agostini | |
| 6,419,286 B1 | 7/2002 | Szablewski | |
| 6,471,262 B1 * | 10/2002 | Schwab | 292/336.3 |
| 6,565,134 B1 * | 5/2003 | Stuart et al. | 292/336.3 |
| 7,059,641 B2 * | 6/2006 | Chanya | 292/336.3 |
| 7,111,880 B2 * | 9/2006 | Saitoh | 292/336.3 |
| 7,232,164 B2 * | 6/2007 | Lee | 292/336.3 |
| 7,677,614 B2 * | 3/2010 | Monig | 292/336.3 |
| 8,282,142 B2 * | 10/2012 | Fannon | 292/336.3 |
| 2003/0001399 A1 * | 1/2003 | Sato | 292/336.3 |
| 2004/0094974 A1 * | 5/2004 | Song | 292/336.3 |
| 2004/0232710 A1 * | 11/2004 | Jooss et al. | 292/336.3 |
| 2005/0161959 A1 * | 7/2005 | Belchine | 292/336.3 |

FOREIGN PATENT DOCUMENTS

| | | |
|---|---|---|
| JP | 09-088380 | 3/1997 |
| JP | 09-144394 | 6/1997 |
| JP | 11-002056 | 1/1999 |
| JP | 2000-073629 | 3/2000 |
| JP | 2001-003605 | 1/2011 |
| SU | 1724844 | 4/1992 |

* cited by examiner

FIG.2(a)
FIG.2(b)
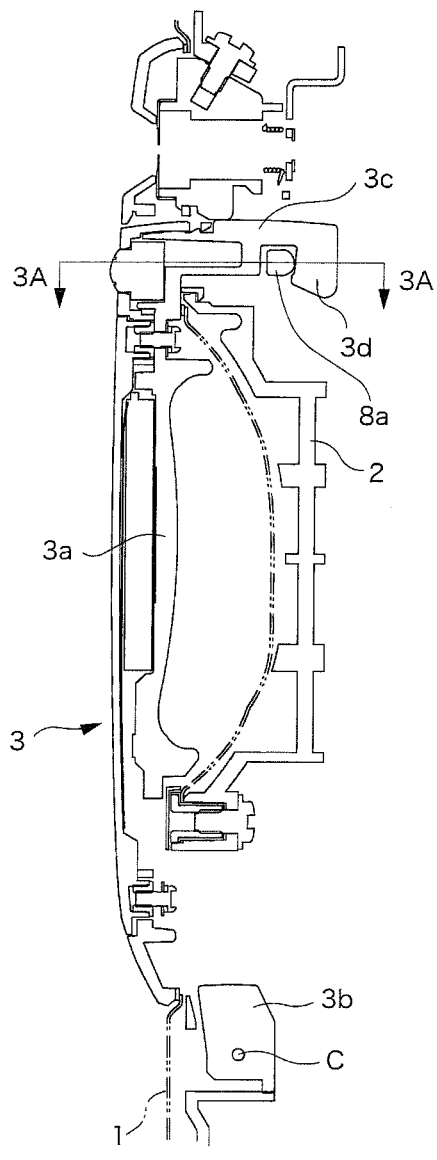
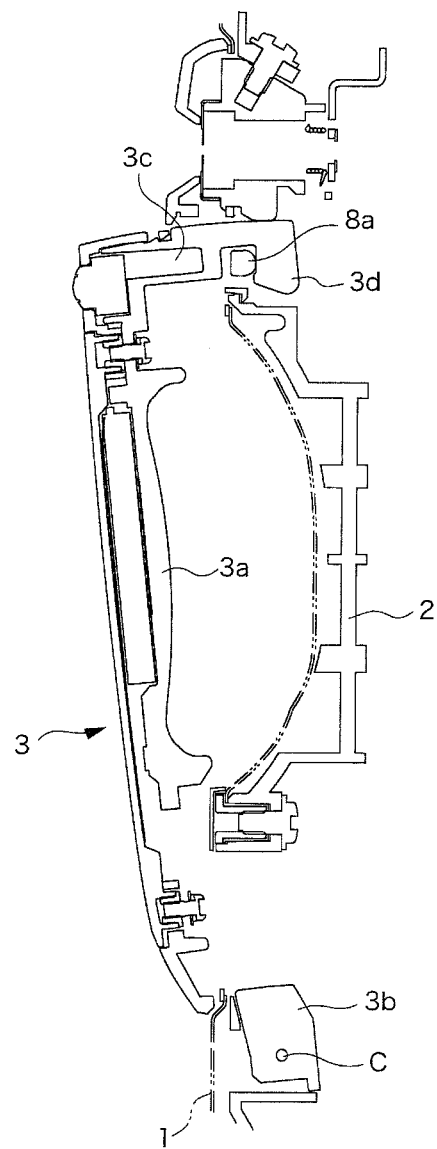

VEHICLE DOOR HANDLE APPARATUS

TECHNICAL FIELD

The present invention relates to a vehicle door handle apparatus.

BACKGROUND ART

Patent Document 1 describes a door handle apparatus which can prevent an erroneous operation by an impact (a collision) from a side of a vehicle. In this conventional-art example, the door handle apparatus is formed by inserting a distal end of an open rod (an operating force transmitting member) in a slide groove opened in an arm of a handle (an operation handle). The slide groove is formed into a U-shape and includes an operating position where a rotating operation of the operation handle is transmitted to the open rod as a depressing operation force and an idle position at both end portions. The open rod is urged to the operating position side by a spring.

For a normal operation, the open rod is urged to the operating position side by the spring, and a rotational operating force exerted on the operation handle is transmitted to the open rod as a depressing force. In contrast to this, when the vehicle is involved in a side collision, the open rod rotates by virtue of inertial force and an upper end thereof moves idly, whereby even though the operation handle rotates by the inertial force, there is no such case that the rotational operating force exerted on the operation handle is transmitted to a lock device.

PRIOR ART DOCUMENT

Patent Document

[Patent Document 1] JP-A-2000-73629

In the conventional-art example, however, since the interruption of transmission of the operating force from the operation handle at the time of side impact makes use of the inertial force of the open rod, there are caused problems that every time a vehicle body layout is changed, the urging force of the spring needs to be recalculated and that an operating force transmitting member such as a cable from which no inertial force can be expected cannot be used.

SUMMARY OF INVENTION

One or more embodiments of the invention provide a vehicle door handle apparatus which incorporates a clutch mechanism therein so as to prevent in an ensured fashion an abnormal opening of a door at the time of a side collision only by mounting the vehicle door handle apparatus on the door.

In accordance with one or more embodiments of the invention, a vehicle handle apparatus is provided with: a handle base 2 fixed to a door 1 of a vehicle; an operation handle 3 connected rotatably to the handle base 2; and a relay lever 8 which includes a connecting portion 6 to the other end of an operation force transmitting member 5 which is connected to a door lock device 4 within the door 1 at one end, which is connected rotatably to the handle base 2, and which is driven to rotate around a pivot 7 by operating to rotate the operation handle 3. The relay lever 8 is divided into a sub-lever member 9 including the connecting portion 6 and a main lever member 10 which is driven to rotate by operating the operation handle 3 and which is pivotally supported so as to rotate relatively around the pivot 7. The main lever member 10 and the sub-lever member 9 are connected in a rotating direction by boundary surfaces thereof being closed together by a connecting element 11 which is held by an appropriate means when the main lever member 10 and the sub-lever member 9 rotate relatively. The connection of the main lever member 10 with the sub-lever member 9 is released by causing the connecting element 11 to withdraw from a boundary closing position (a connecting position) when a predetermined acceleration is inputted.

The operation handle 3 and the relay lever 8 which rotates by operating to rotate the operation handle lever 3 are connected to the handle base 2, and the other end of the operating force transmitting member 5, which is connected to the door lock device 4 disposed within the door 1 at the one end thereof, is connected to the connecting portion 6 of the relay lever 8.

The relay lever 8 is formed by connecting the main lever member 10 which is driven to rotate by operating to rotate the operation handle 3 and the sub-lever member 9 to which the operating force transmitting member 5 via the connecting element 11, and when in normal operation, the main lever member 10 and the sub-lever member 9 are made to operate as an integral unit so as to transmit the rotational operating force exerted on the operation handle 3 to the operating force transmitting member 5.

When an acceleration by inertial force is inputted to the door 1 as a result of the vehicle being involved in a side collision, the connection of the main lever member 10 to the sub-lever member 9 by the connecting element 11 is released, whereby even though the operation handle 3 is operated in an opening direction by the inertial force, an operating force associated with the operation of the operation handle 3 is not transmitted to the sub-lever member 9. As a result, the transmission of large inertial force generated in the operation handle 3 to the sub-lever member 9 is interrupted, thereby making it possible to prevent an abnormal opening of the door 1 at the time of side impact.

It is desirable that such a large inertial force as to cause the lock device to operate erroneously is made not to be generated in any other constituent elements than the operation handle 3 when the vehicle is involved in a side impact, and it is desirable that a cable is used for the operating force transmitting member 5. It is desirable that the shape of the sub-lever member 9 is determined so that inertial moment becomes smaller.

In order for the connecting element 11 to be held in the boundary closing position and to be moved to the boundary opening position when acceleration is inputted, known mechanisms can be adopted. For example, a mechanism can be adopted in which the connecting element 11 is formed into a rod member, is held in the boundary closing position by a spring and is caused to move to the boundary opening position against a reaction force of the spring. However, the following configuration can be adopted.

A stopper 13 is held either on the main lever member 10 or on the sub-lever member 9 which is adapted to move freely between a restricting position where the connecting element 11 is held in the boundary closing position while being supported rotatably and a restriction releasing position where the rotatable supporting of the connecting element 11 is released and which is urged to the restricting position side by a an urging member 12, whereby, when the predetermined acceleration is inputted, the stopper 13 is caused to move to the restriction releasing position against an urging force of the urging member 12, so as to release the connection of the main lever member 10 with the sub-lever member 9.

In this case, the connecting element 11 is held in the boundary closing position by the stopper 13 so as to connect the main lever member 10 with the sub-lever member 9, and when the stopper 13 moves as a result of the acceleration being inputted, the connecting element 11 loses the support by the stopper 13 to thereby move to the boundary opening position. The movement of the connecting element 11 to the boundary opening position may be effected by making use of its own weight or a shearing force generated in the boundary.

Further, the stopper 13 is formed into a rod shape and an erected posture at one end functioning as a fulcrum is held by a coil spring 12 as the urging member 12, and when the predetermined acceleration is inputted, the stopper 13 is shifted to an inclined posture against the urging force of the coil spring to thereby move from the restricting position to the restriction releasing position, whereby the sensitivity for acceleration can be enhanced.

According to one or more embodiments of the invention, the abnormal opening of the door at the time of side collision can be prevented in an ensured fashion only by mounting the door handle apparatus on the door.

Other aspects and advantages of the invention will be apparent from the following description, the drawings and the claims.

BRIEF DESCRIPTION OF DRAWINGS

FIG. 2(*a*) is a sectional view taken along a line 2A-2A in FIG. 1, which shows an initial state. FIG. 2(*b*) is a sectional view taken along the line 2A-2A in FIG. 1, which shows an operating state.

FIG. 3(*b*) is a sectional view taken along the line 3A-3A in FIG. 2(*a*), which shows the operating state.

FIG. 4(*b*) is a sectional view showing when acceleration is inputted. FIG. 4(*c*) is a sectional view showing a restoring step to an original position.

FIG. 5(*b*) is a sectional view taken along 5A-5B in FIG. 3(*a*). FIG. 5(*c*) is a sectional view showing when the acceleration is inputted.

DESCRIPTION OF EMBODIMENTS

An exemplary embodiment of the invention is described in reference to drawings.

Figure 1:
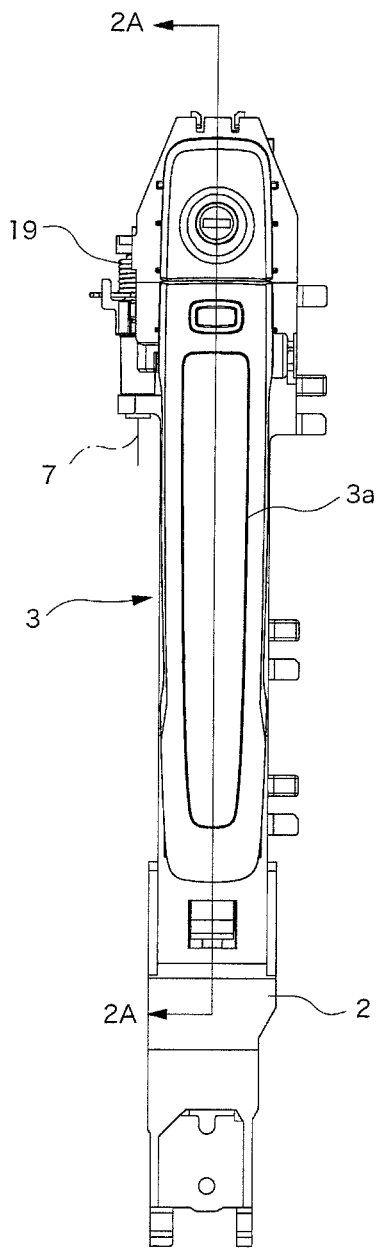
FIG. 1 is a front view of a handle apparatus of an exemplary embodiment of the invention.

As is shown in FIG. 1 and others, a handle apparatus has a handle base 2 which is fixed to a door 1 (a door panel) of a vehicle and an operation handle 3 which is connected rotatably to the handle base 2. The handle apparatus of this embodiment is a so-called grip type handle apparatus in which an intermediate portion (a grip portion 3*a*) of the operation handle 3 is gripped to pull out the operation handle 3 and is mounted on the door 1 in a horizontal posture with a lower portion as viewed in FIG. 1 directed to a front of the vehicle.

As is shown in FIG. 2(*a*), a hinge projecting portion 3*b* is provided at a front end of the operation handle 3 so as to project therefrom. The operation handle 3 is connected to the handle base 2 by causing the hinge projecting portion 3*b* to lock on the handle base 2 in an interior of the door 1, and the operation handle 3 can be operated to rotate around a rotational center C in the connected state. (In this specification, based on a posture of the door handle apparatus which is mounted on the vehicle, a vehicle length direction is defined as denoting "front, rear" and a vehicle width direction is defined as denoting "obverse, reverse.")

An operation leg 3*c* is provided on a reverse side of a rear end of the operation handle so as to project therefrom, and when the door handle apparatus is mounted on the door 1, the operation leg 3*c* is inserted into the door 1. A working projecting portion 3*d* is provided at a distal end of the operation leg 3*c* so as to project to the front, and when the operation handle 3 is operated to rotate from an initial position shown in FIG. 2(*a*) to an operating position shown in FIG. 2(*b*), the working projecting portion 3*d* moves to an obverse side.

Figure 3A:
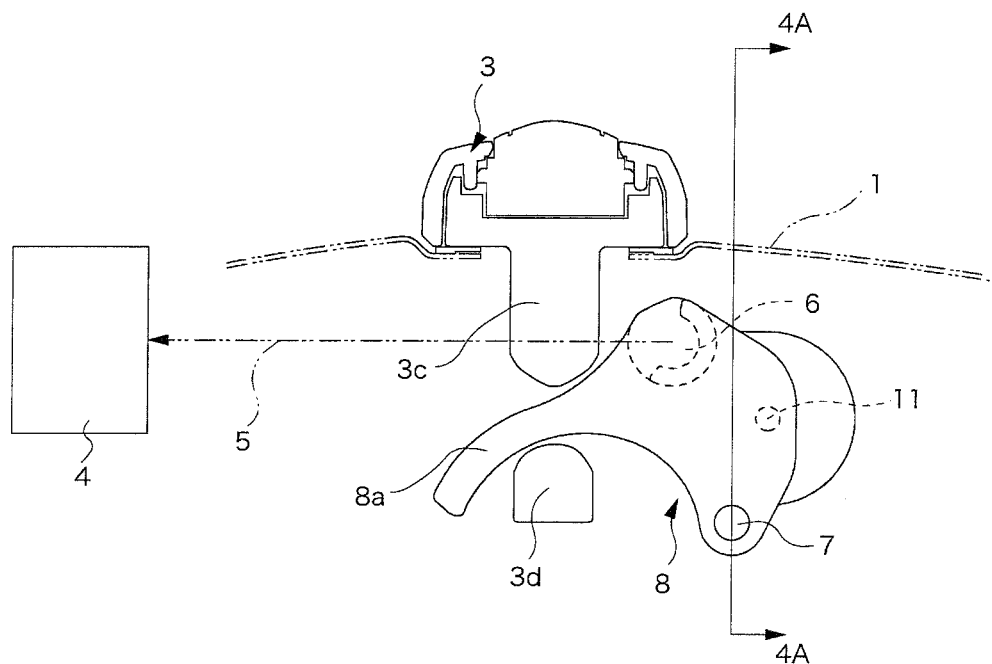
FIG. 3(*a*) is a sectional view taken along a line 3A-3A in FIG. 2(*a*), which shows the initial state.
Figure 3B:
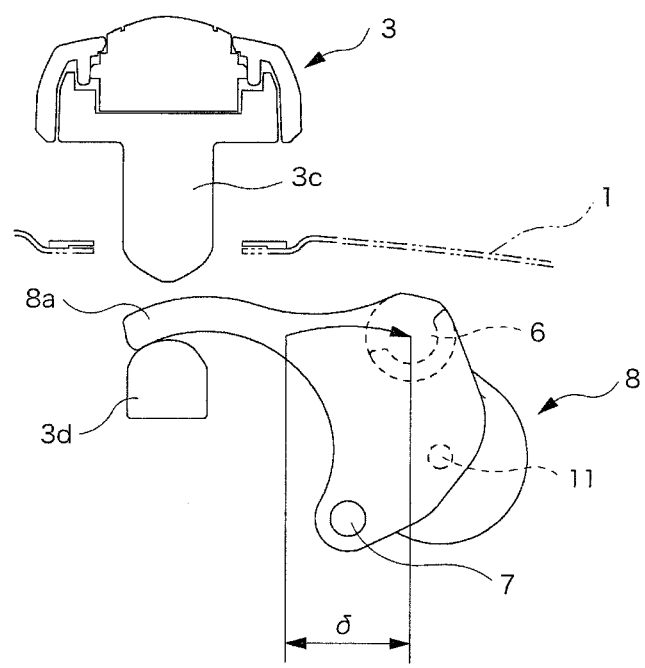

As is shown in FIG. 3(*a*) in which a left-right direction denotes a vertical direction in an actual mounted condition, For a movement of the working projecting portion 3*d* in association with a rotational operation of the operation handle to be transmitted to a door lock device 4 which is disposed below the door handle apparatus (to the left in FIG. 3(*a*)), a relay lever 8 is mounted on the handle base 2, which relay lever 8 has a connecting portion 6 to an operating force transmitting member 5. The relay lever 8 is pivotally supported to rotate freely by a pivot 7 whose longitudinal direction is oriented in a front-rear direction and is urged towards an initial rotating position shown in FIG. 3(*a*) by a torsion spring 19 shown in FIG. 1.

This relay lever 8 includes a working piece 8*a*, which interferes with a moving path of the working projecting portion 3*d* when the operation handle 3 is operated. When the operation handle 3 is in the initial position shown in FIG. 3(*a*), the working piece 8*a* applies an urging force directed towards the initial position side by the torsion spring 19 to the operation handle 3, so as to prevent looseness of the operation handle 3.

As is shown in FIG. 3(*b*), when the operation handle 3 is operated to rotate from the initial position, the working piece 8*a* is pushed out by the working projecting portion 3*d*, and the relay lever 8 rotates clockwise. The connecting portion 6 then moves a predetermined distance (δ) in a vehicle height direction by the rotation of the relay lever 8, and the rotating operation force exerted on the operation lever 3 is transmitted to the door lock device 4 byway of the operating force transmitting member 5.

In this embodiment, a pull type cable device, in which an inner cable is inserted movably in an outer casing, is used as the operating force transmitting member 5, and the connecting portion 6 is formed as a locking hole where an inner metal terminal fixture such as a nipple end is inserted and locked. In addition, a connecting means (not shown) is formed on the handle base 2 for connecting the metal terminal fixture of the outer casing to the vicinity of the moving path of the connecting portion 6.

Thus, the relay lever 8 changes the direction of the operating force exerted on the operation handle 3 to transmit the force to the operating force transmitting member 5 in the way described above. This relay lever 8 is, as is shown in FIGS. 4(*a*) to 5(*c*), divided into a main lever member 10 and a sub-lever member 9, each of which is connected rotatably to the handle base 2 by the pivot 7 that has been described above.

In general, the sub-lever member 9 is made into an independent member by separating only the connecting portion 6 from the relay lever 8 and is pivotally supported by the pivot 7 so as to rotate relative to the main lever member 10 which is made up of the remaining portion of the relay lever 8. The main lever member 10 includes the working piece 8*a* which interferes with the working projecting portion 3*d* to thereby be driven to rotate at all times whenever the operation handle 3 is operated to rotate. Further, the urging force by the torsion spring 19 is applied to the main lever member 10, whereby the operation handle 3 is urged to the initial position by the main lever member 10.

The main lever member 10 and the sub-lever member 9, which are formed in the way described above, are connected to each other via a clutch. As is shown in FIGS. 4(a) to 5(c), the clutch has a clutch case 16 which is formed on the sub-lever member 9 and a clutch receiving surface 10a which is formed on the main lever member 10. A sliding contact wall 14, which is formed on a rear end surface of the clutch case 16 and the clutch receiving surface 10a of the main lever member 10 are formed by planes which are both at right angles to the pivot 7 and are in abutment with each other. A boundary of the sliding contact wall 14 and the clutch receiving surface 10a are closed by a spherical connecting element 11. A semi-spherical fitting recess portion 17 is formed on the clutch receiving surface 10a for the connecting element 11 to fit therein.

Figure 4A:
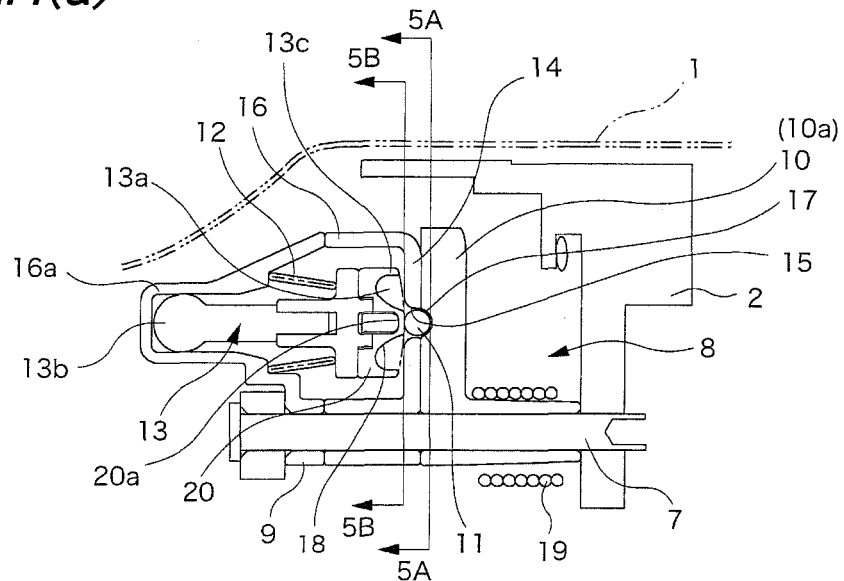
FIG. 4(*a*) is a sectional view taken along a line 4A-4A in FIG. 3(*a*), which shows the initial state.

As is shown in FIG. 4(a), a circular clutch engaging and disengaging hole 15 is opened in the sliding contact wall 14 of the clutch case 16 so as to be square to the fitting recess portion 17. A front end circumferential wall of the clutch engaging and disengaging hole 15 is chamfered round so as to promote a fall of the connecting element 11 into a holding recess portion 13a when the clutch is disengaged as will be described later.

A stopper 13 is accommodated within the clutch case 16. The stopper 13 is formed into a rod-like shape and includes a spherical fulcrum end 13b at one end and a circular disc-like ball supporting stage 20 at the other end portion. The stopper 13 is disposed parallel to the pivot 7.

For the stopper 13 to be held in a horizontal posture (an erected posture) which is parallel to the pivot 7, a holding cylindrical portion 16a is formed at a front end portion of the clutch case 16, and a conical coil spring 12 is disposed within the clutch case 16. The holding cylindrical portion 16a receives the spherical fulcrum end 13b and supports the stopper 13 rotatably while restricting a movement of the spherical fulcrum end 13b within a plane which is at right angles to the pivot 7. The conical coil spring 12 is brought into abutment with a front end face of the ball supporting stage 20 so as to restrict a rotation (an inclination) of the stopper 13 from the erected posture by an urging force exerted thereby and brings a rear end face of the ball supporting stage 20 into press contact with an inner wall of the sliding contact wall 14.

Further, the rear end face of the ball supporting stage 20 of the stopper 13 is formed by a spherical surface whose curvature center coincides with a rotational center of the stopper 13, so as to permit a falling action of the stopper 13 while in abutment with the inner wall of the sliding contact wall 14 of the clutch case 16. The holding recess portion 13a, which is surrounded by a rising wall 13c, is formed is on the rear end face of the ball supporting stage 20 so as to surround a ball rotatably supporting portion 20a which is set at a central portion of the rear end face.

As is shown in FIG. 4(a), in such a state that no acceleration is inputted to the handle apparatus, the stopper 13 maintains its erected state by the conical coil spring 12 and is held in a restricting position. In this state, the spherical fulcrum end 13b of the stopper 13, the ball rotatably supporting portion 20a, the clutch engaging and disengaging hole 15 in the clutch case 16 and the fitting recess portion 17 of the main lever member 10 are aligned in a straight line, and the connecting element 11, which fits in the clutch engaging and disengaging hole 15 and the fitting recess portion 17 to close the boundary, is held in a connecting position by its moving path into the clutch case being closed by the ball rotatably supporting portion 20a.

Consequently, in this embodiment, at the time of normal operation in which no acceleration is inputted to the handle apparatus, the main lever member 10 and the clutch case 16 formed on the sub-lever member 9 are connected in a rotating direction via the connecting element 11 which is restricted from moving in a dislocating direction by the ball rotatably supporting portion 20a, and the operating force exerted on the operation handle 3 is transmitted to the door lock device 4 by way of the relay lever 8 which is now being in an integrated state.

Figure 4B:
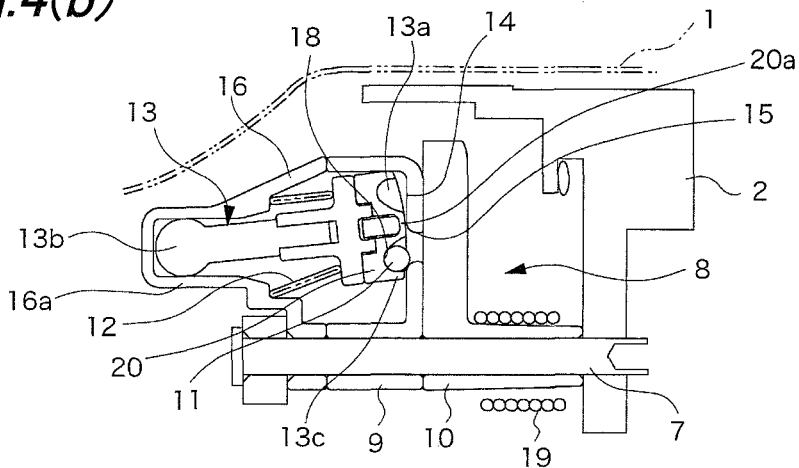

In contrast to this, when acceleration is generated in the handle apparatus by a side collision, as is shown in FIG. 4(b), the stopper 13 which maintains its erected state by the conical coil spring 12 falls or is inclined to move to a restriction releasing position, whereby the rotatable supporting of the connecting element 11 by the ball rotatably supporting portion 20a is released. In association with release of the rotatable supporting of the connecting element 11, the connecting element 11 is allowed to move into an interior of the clutch case 16, and thereafter, the connecting element 11 falls in the holding recess portion 13a by virtue of its own weight or shearing force acting on the boundary between the clutch receiving surface 10a and the sliding contact wall 14, whereby the closure of the boundary surfaces by the connecting element 11 is releases.

Figure 5A:
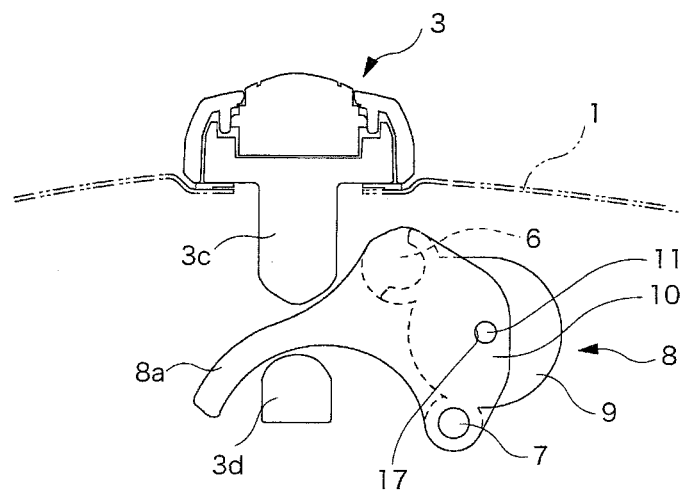
FIG. 5(*a*) is a sectional view taken along the line 5A-5A in FIG. 3(*a*), which shows when acceleration is inputted.
Figure 5B:
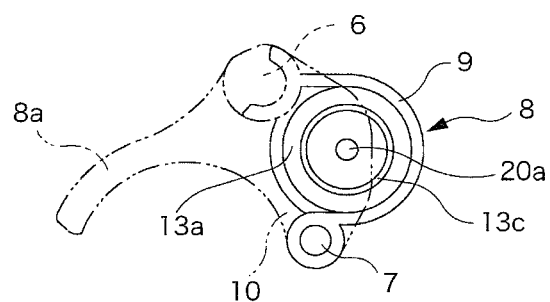
Figure 5C:
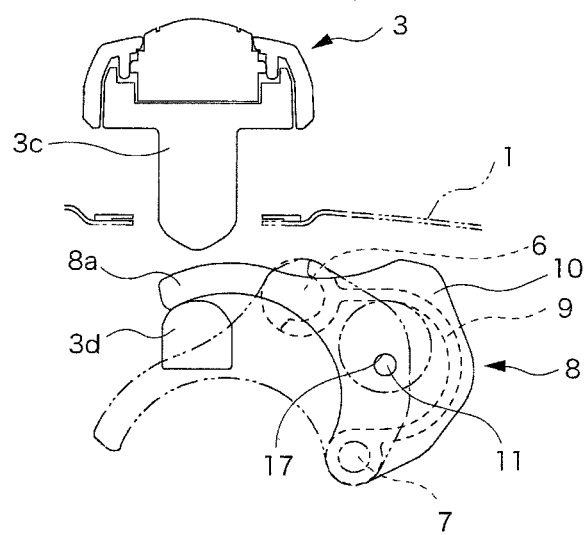

On the other hand, since, when acceleration is inputted to the handle apparatus, an operating force is generated in the operation handle 3 in which the operation handle 3 is operated to rotate, the working projecting portion 3d moves to the obverse side as is shown in FIG. 5(c), whereby the main lever member 10 is rotated. However, since the clutch is being disengaged, the operating force is not transmitted to the sub-lever member 9, whereby the connecting portion 6 stays in its original position.

Figure 4C:
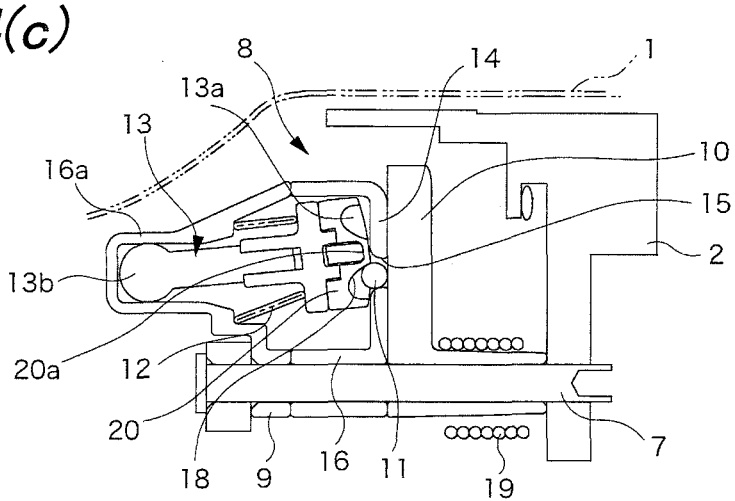

In such a state that the clutch is disengaged, since a restoring force is being generated in the stopper 13 by the conical coil spring 12 which acts in a direction in which the erected posture is restored, when the input of acceleration is completed, as is shown in FIG. 4(c), the stopper 13 attempts to restore its erected posture. As this occurs, a bottom wall of the holding recess portion 13a or, exactly speaking, a cam surface 18 which is formed at a proximal end of the ball rotatably supporting portion 20a presses the connecting element 11 downwards as viewed in FIG. 4(c).

On the other hand, as is shown in FIG. 4(b), since the holding recess portion 13a is formed to have such a height that part of the connecting element 11 faces a circumferential wall of the clutch engaging and disengaging hole 15, a force is exerted on the connecting element 11 which attempts to push the connecting element 11 into the clutch engaging and disengaging hole 15 using the circumferential wall of the clutch engaging and disengaging hole 15 as a guide in association with the stopper 13 being restored to its erected posture. When the main lever member 10 returns to its original position by a reaction force of the torsion spring 19 at the same time, or before or after the force is exerted as described above, the connecting element 11 enters the clutch engaging and disengaging hole 15 again to fit in the fitting recess portion 17, whereby the original state is restored.

In this embodiment, while the clutch case 16 is described as being fixed to the sub-lever member 9, the clutch case 16 can be fixed to a side of the main lever member 10. Further, while the stopper 13 is described as taking the horizontal posture as its initial posture so as to deal with a side collision, the stopper 13 can be placed in an inclined fashion as a matter of convenience in layout. While the stopper 13 is formed so as to fall in every direction about the spherical fulcrum end and is configured so as to also deal directly with acceleration inputted from a direction which is inclined relative to the vehicle width direction, the construction of the stopper 13 can be simplified by, for example, limiting the falling directions by making the stopper 13 rotate freely around a predetermined pivot.

In addition, while the spring specifications of the conical coil spring 12 can be determined by calculation or experimentally so that a clutch disengaging action occurs at a desired timing, in the event of a small spring constant, in order to prevent deterioration of the spring due to corrosion or the like, it is desirable that the interior of the clutch case 16 is sealed.

INDUSTRIAL APPLICABILITY

This invention is applicable to a door handle apparatus of a vehicle.

DESCRIPTION OF REFERENCE NUMERALS 1 door; 2 handle base; 3 operation handle; 4 door lock device; 5 operating force transmitting member; 6 connecting portion; 7 pivot; 8 relay lever; 9 sub-lever member; 10 main lever member; 11 connecting element; 12 an urging member; 13 stopper; 14 sliding contact wall; 15 clutch engaging and disengaging hole; 16 clutch case; 17 fitting recess portion; 18 cam surface.

The invention claimed is:

1. A vehicle handle apparatus comprising:
a handle base fixed to a door of a vehicle;
an operation handle rotatably connected to the handle base; and
a relay lever which is directly rotatably connected to the handle base via a pivot, the relay lever being driven to rotate around the pivot by operating the operation handle to engage a working piece of the relay lever with a working projecting portion of the operating handle,
wherein the relay lever comprises:
a sub-lever member including a connecting portion connected to an operating force transmitting member coupled to a door lock device in the door; and
a main lever member which is driven to rotate by operating the operation handle,
wherein the sub-lever member and the main lever member are pivotally connected via the pivot so as to relatively rotate with respect to each other,
wherein the main lever member is connected with the sub-lever member by a connecting element when the connecting element is in a connecting position, and
wherein the connecting element is withdrawn from said connecting position by inputting a predetermined acceleration, so that a connection of the main lever member with the sub-lever member is released.

2. The vehicle door handle apparatus according to claim 1, further comprising:
a stopper which is held on one of the main lever member and the sub-lever member, which is adapted to move between a restricting position for holding the connecting element in said connecting position and a restriction releasing position for withdrawing the connecting element from said connecting position, and which is urged to a side of the restricting position by an urging member,
when the predetermined acceleration is inputted, the stopper moves to the restriction releasing position against an urging force of the urging member so as to release the connection of the main lever member with the sub-lever member.

3. The vehicle door handle apparatus according to claim 2, wherein the stopper is formed into a rod shape and an erected posture at one end functioning as a fulcrum is held by a coil spring as the urging member, and
wherein, when the predetermined acceleration is inputted, the stopper is shifted to an inclined posture against the urging force of the urging member and moves from the restricting position to the restriction releasing position.

4. The vehicle door handle apparatus according to claim 3, wherein the connecting element is formed into a spherical shape,
wherein the stopper and the coil spring are accommodated within a clutch case which includes a clutch engaging and disengaging hole in which the connecting element fits on a sliding contact wall which makes up one of boundary surfaces between the main lever member with the sub-lever member, and
wherein a fitting recess portion in which the connecting element fits is formed on the other of the boundary surfaces.

5. The vehicle door handle apparatus according to claim 4, wherein the stopper includes a cam surface which is adopted to hold the connecting element that is withdrawn from said connecting position within the clutch engaging and disengaging hole, and also to move the connecting element to said connecting position as the stopper moves to the restricting position.

6. A vehicle handle apparatus comprising:
a handle base fixed to a door of a vehicle;
an operation handle rotatably connected to the handle base; and
a relay lever which is directly rotatably connected to the handle base via a pivot, the relay lever being driven to rotate around the pivot by operating the operation handle,
wherein the relay lever comprises:
a sub-lever member including a connecting portion connected to an operating force transmitting member coupled to a door lock device in the door; and
a main lever member which is driven to rotate by operating the operation handle,
wherein the sub-lever member and the main lever member are pivotally connected via the pivot so as to relatively rotate with respect to each other,
wherein the main lever member is connected with the sub-lever member by a connecting element when the connecting element is in a connecting position, and
wherein the connecting element is withdrawn from said connecting position by inputting a predetermined acceleration, so that a connection of the main lever member with the sub-lever member is released.

7. The vehicle door handle apparatus according to claim 6, further comprising:
a stopper which is held on one of the main lever member and the sub-lever member, which is adapted to move between a restricting position for holding the connecting element in said connecting position and a restriction releasing position for withdrawing the connecting element from said connecting position, and which is urged to a side of the restricting position by an urging member,
when the predetermined acceleration is inputted, the stopper moves to the restriction releasing position against an urging force of the urging member so as to release the connection of the main lever member with the sub-lever member.

8. The vehicle door handle apparatus according to claim 7, wherein the stopper is formed into a rod shape and an erected posture at one end functioning as a fulcrum is held by a coil spring as the urging member, and wherein, when the predetermined acceleration is inputted, the stopper is shifted to an inclined posture against the urging force of the urging member and moves from the restricting position to the restriction releasing position.

9. The vehicle door handle apparatus according to claim 8, wherein the connecting element is formed into a spherical shape, wherein the stopper and the coil spring are accommodated within a clutch case which includes a clutch engaging and disengaging hole in which the connecting element fits on a sliding contact wall which makes up one of boundary surfaces between the main lever member with the sub-lever member, and wherein a fitting recess portion in which the connecting element fits is formed on the other of the boundary surfaces.

10. The vehicle door handle apparatus according to claim 9, wherein the stopper includes a cam surface which is adopted to hold the connecting element that is withdrawn from said connecting position within the clutch engaging and disengaging hole, and also to move the connecting element to said connecting position as the stopper moves to the restricting position.

* * * * *